United States Patent [19]

Bordignon

[11] Patent Number: 4,920,439
[45] Date of Patent: Apr. 24, 1990

[54] GUIDE ELEMENT STRUCTURE ENGAGEABLE IN SLIDING CONTACT WITH A MAGNETIC SUPPORT

[76] Inventor: Abramo Bordignon, Via Palmiro Togliatti, 32 - 20030 Senago (Province of Milan), Italy

[21] Appl. No.: 194,600

[22] Filed: May 16, 1988

[30] Foreign Application Priority Data

Jun. 1, 1987 [IT] Italy .................. 20743 A/87

[51] Int. Cl.$^5$ .................. G11B 13/60; B65H 23/04
[52] U.S. Cl. .................. 360/130.21; 226/196; 242/76
[58] Field of Search .................. 226/196; 242/76; 360/130.21, 130.31–130.34

[56] References Cited

U.S. PATENT DOCUMENTS

| 3,682,486 | 8/1972 | Zwetzig et al. | 360/130.33 |
| 4,389,010 | 6/1983 | Oishi et al. | 226/196 |
| 4,466,582 | 8/1984 | Shiba | 226/196 |

Primary Examiner—Robert S. Tupper
Attorney, Agent, or Firm—Guido Modiano; Albert Josif

[57] ABSTRACT

The magnetic tape guide element comprises a body positionable adjacent to a magnetic tape. A plurality of monofilaments is provided on a portion of the body. The monofilaments each have an end fixed to the body and a said free end adapted for engaging a magnetic tape, in sliding contact engagement therewith.

13 Claims, 1 Drawing Sheet ic tape guide element.

GUIDE ELEMENT STRUCTURE ENGAGEABLE IN SLIDING CONTACT WITH A MAGNETIC SUPPORT

BACKGROUND OF THE INVENTION

The present invention relates to a magnetic tape guide element.

As known, magnetic tape guide elements constituted by small cylinders, pins and the like are currently provided in recording and playback devices and in magnetic tape cassettes. The guide elements engage the magnetic tape, in sliding contact engagement therewith, during playback and recording.

In magnetic tape recording systems, cylindrical guide elements are provided which in practice delimit the path of the magnetic tape, and keep the magnetic tape coplanar.

Pins are also provided which act guides or as abutment elements, for example, at areas affected by the tape cleaning pad.

Known magnetic tape guide elements must have a particularly smooth surface, so as to avoid damaging the magnetic tape, which generally comprises a polyester support, having a magnetic layer applied to one side thereof.

Such known magnetic tape guide elements comprise small cylinders manufactured, for example, by providing tubular portions which are externally coated with metallic material. The metallic material is processed to impart it with a perfectly smooth surface to avoid causing abrasion or wear of the magnetic tape.

Known magnetic tape guide elements require complicated and expensive surface treatments, and frequently imply the use of relatively expensive materials.

Other known magnetic tape guide elements comprise small cylinders or pins made of synthetic plastic material which can be imparted with a smooth surface via treatment steps which are simpler than those required to impart a smooth surface on small cylinders and pins made of metallic material. However, magnetic tape guide elements made of synthetic plastic material have the disadvantage that the magnetic tape may abrade the surface of the plastic material constituting the guide element. This constitutes an extremely severe disadvantage since particles may be dispersed from the abraded surface, causing further damage and wear.

SUMMARY OF THE INVENTION

The aim of the inention is to eliminate the above described disadvantages by providing a magnetic tape guide element, which is different from conventional guide elements having a substantially rigid and smooth contact surface, and which achieves better conditions of sliding contact engagement between the magnetic tape and the guide element, whereby wear is eliminated.

Within the above described aim, a particular object of the invention is to provide a magnetic tape guide element which, besides modifying the trajectory of the magnetic tape, also constitutes a plurality of tape-cleaning elements.

Another object of the present invention is to provide a magnetic tape guide element which does not impede sliding movement of the magnetic tape, and which is capable of exerting a reaction force on the magnetic tape which is substantially uniform and constant throughout all points of contact between the guide element and the magnetic tape.

A further object of the present invention is to provide a magnetic tape guide element which may have good electric conductivity characteristics, and which may also have anti-static, characteristics.

The above described aim and objects, and other objects of the invention which will become apparent hereinafter, are achieved by a magnetic tape guide element, engageable in sliding contact engagement with a magnetic tape, said magnetic tape guide element comprising;

a body positioned proximate to a magnetic tape, at least one portion defined on said body, said portion being adapted for contacting a magnetic tape, and a plurality of monofilaments each having an end and a free end, said monofilaments being located at least at said one portion of said body, said end of each of said monofilaments being fixed to said body, said free end of each of said monofilaments being adapted for contact engagement with a magnetic tape.

BRIEF DESCRIPTION OF THE DRAWINGS

Further characteristics and advantages of the magnetic tape guide element according to the invention will become apparent form the following description of some preferred but not exclusive embodiments thereof, as shown in the accompanying illustrative, non-limitative drawings, wherein.

DESCRIPTION OF THE PREFERRED EMBODIMENTS

Figures 1, 2, 3, 4:
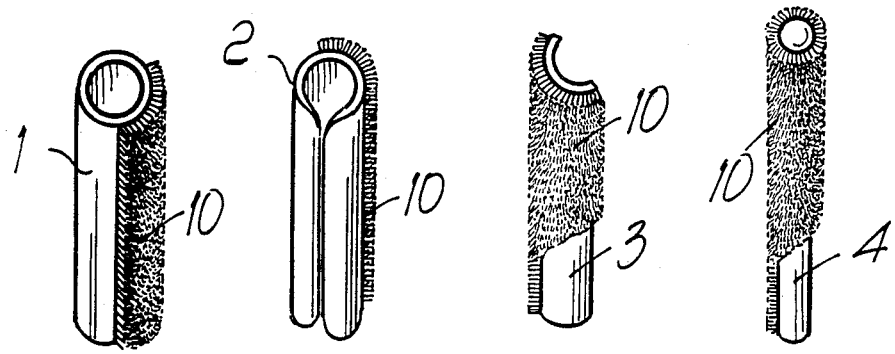
FIG. 1 is a magnetic tape guide element, constituted by a small tube.
FIG. 2 is a magnetic tape guide element constituted by a cylindrical element.
FIG. 3 is a magnetic tape guide element constituted by a cylindrical portion.
FIG. 4 is a magnetic tape guide element constituted by a pin.
Figure 5:
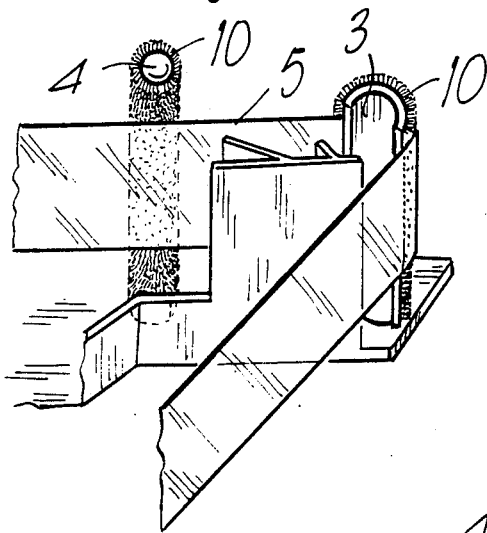
FIG. 5 is a schematic perspective view of the magnetic tape guide element applied to the inside of a video cassette.
Figure 6:
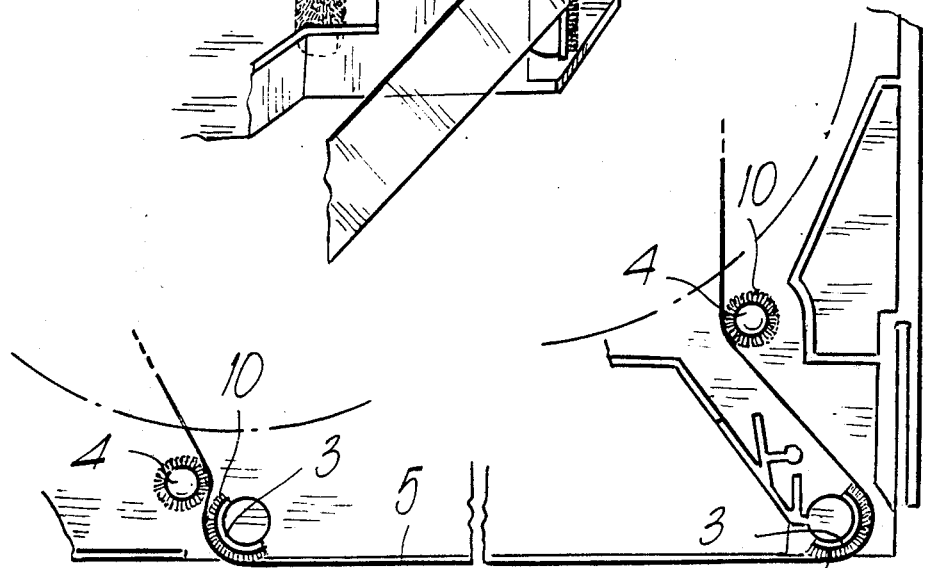
FIG. 6 is a schematic plan view of the magnetic tape guide elements, according to the invention, arranged inside a cassette.

With reference to the above described figures, the magnetic tape guide element according to the invention has a body may be constituted, as indicated in FIG. 1, by a small tube made of metallic material, or by a cylindrical element 2 obtained by folding a small plate-like element as shown in FIG. 2, or by a cylindrical portion 3, illustrated in FIG. 3; or by a pin 4, as illustrated in FIG. 4.

Naturally other configurations known in the art may be adopted.

The peculiar characteristic of the invention resides in the fact that a plurality of monofilaments 10 is provided on at least one portion of the magnetic tape guide element, at a portion thereof which makes contact with the magnetic tape, indicated by the reference numeral 5. The body of the magnetic tape guide element may be constituted by the elements 1, 2, 3, or 4.

The monofilaments or monothreads 10 are each constituted by a long, thin element having one end embedded in the body of the guide element and being stressed so as to deform under combined bending moments and compression forces. From experimental tests it has been established in practice that, for an angle comprised between 20° and 80° defined by the tangent at the terminal portion of the monofilament and the fixing plane of the monofilament, there occurs a variation of the elastic force which is comprised within 27%, i.e. a force variable by less than + or −13% for a considerable camber which can be estimated at approximately 40% of the length of the monofilament.

To produce the magnetic tape guide elements according to the invention, monofilaments of a desired quality and diameter are selected and cut to a predetermined length. Then the desired number of monofilaments per cm2 is associated with the guide element to produce a velvet-like surface, having well-defined parameters.

The monofilaments must have an extremely low coefficient of friction and good elasticity. It is also possible to use monofilaments with predetermined antistatic or electrical conductivity characteristics. To meet these requirements, synthetic polyamide fibers may be used, such as acrylic fibers, polyester and cellulose triacetate fibers, or other fibers which have the same characteristics.

The dimensions of the fibers have been selected in the category comprised between 0.2 tex and 0.9 tex (which correspond to diameters comprised between 15 microns and 32 microns). Fibers of such size are readily available.

An analysis of the various parameters of the fibers (i.e. diameter, modulus of elasticity) has been carried out according to the minimum camber (approximately 0.25 mm diameter) of the various configurations of the magnetic guide elements. The selected values preferably envisage the use of fibers having;

a diameter of 15 microns, a useful length of 0.6 mm, and density of monofilaments assessable at approximately 400/mm2, or;

a diameter of 20 microns, a useful length of 0.9 mm, and a monofilament density of 200/mm2, or;

a diameter of 32 microns, a length of 1.6 mm, and a monofilament density of 100 per mm2.

The number, the diameter and the density of monofilaments are in any case freely selectable even in ranges falling outside the above-mentioned ranges, which are those capable of imparting the required characteristics.

From experimental tests, it has been found that the sliding friction coefficient K is comprised between 0.10 and 0.17, which is an optimum K value. Furthermore a dust confinement of considerably high value is achieved. Dust confinement is not observable in the solutions of the known art which, using surfaces as smooth as possible, had no element capable of performing dust confinement.

For example, by employing polyamide fibers having a diameter of 20 microns and a length of 0.9 mm in a density of 250 monofilaments per mm2, a space for dust confinement greater than 32 mm3/cm2 is obtained.

Monothreads, selected according to the above described criteria may be applied to a support layer which, after being cut to size, is glued to the body 1, 2, 3 or 4 of the magnetic tape guide element.

Alternatively, the monofilaments may be directly applied to the portion of the guide element which is contacted by the magnetic tape 5, by treating said portion in a manner similar to the treatment performed on the monofilament supporting layer.

Direct application of the monofilaments simplifies production, since it is not necessary to apply a support layer bearing monofilaments to the body of the magnetic tape guide element. The monofilaments are applied directly onto the body of the magnetic tape guide element.

The monofilaments arranged in the above described manner can be securely applied to magnetic tape guide element bodies having different shapes. Furthermore, the monofilaments are capable of exerting substantially constant specific pressures in every point of sliding contact engagement with the magnetic tape.

The use of a plurality monofilaments arranged substantially perpendicular with respect to the magnetic tape, wherein each monofilament is not connected to the adjacent monofilaments, does not impede the movement of the magnetic tape. Because of the fact that the monofilaments are arranged orthogonally with respect to the direction of movement of the magnetic tape, their unitary reaction force is in the order of a few milligrams, and the adaptation to torsional movements of the flexed apex of the monofilament occurs with reaction forces of a few micrograms.

Another important aspect of the invention resides in the fact that said monofilaments have a very reduced cost with respect to the currently used systems, which require complicated surface treatments to obtain a contact surface as smooth and resistant as possible.

Another aspect of the invention resides in the fact that the monofilaments cannot be spontaneously engaged by any roughness or edge present on the magnetic tape sliding thereon. Thus, none of the monofilaments become loose and correct sliding movement of the magnetic tape over the monofilaments is maintained.

As known, in order to achieve a long working life of tape heads and magnetic tape systems, the magnetic tape guide elements must have very low coefficients of friction. It is known in the field of tribology that the coefficient of friction and the specific pressure are mutually linked by an inverse correlation.

Currently, the average specific pressures recommended by international norms must be in the order of a few grams per mm2. In the magnetic tape guide element according to the invention, the monofilaments allow very low coefficients of friction to be achieved, regardless of the material used. Coefficients of friction are considerably reduced since the contact surface of the numerous monofilaments per mm2, arranged substantially uniformly on the entire surface contacting the magnetic tape, is much less than one thousandth of the affected surface. Extremely high-density micropressures with considerably high localized specific pressures are therefore determined, such as to however determine very low average coefficients of friction which are advantageous in the use of the magnetic tape guide elements.

It should also be added that the invention also permits the use of conductive monofilaments, without thereby implying modifications of the production process. The conductive monofilaments may be constituted, for example, by carbon fibers or by polyamide fibers rendered conductive, for example, by graphite-coating. The monofilaments thus permits acumulated static electricity to be discharged. The static electricity is dispersed via the magnetic tape guide system, the sensitive side of the magnetic tape, and tape head or final magnetic tape guide.

This characteristic is especially advantageous if used at the magnetic tape guide element which acts as an abutment pin for the pad or tape-cleaning presser.

Said monofilaments 10 are provided on a portion of the magnetic tape guide element which has an extension at least equal to the transverse extension of the magnetic tape. Advantageously, an extension of the portion of the guide element bearing the monofilaments 10 can be provided, thereby defining a portion which is wider than the width of the magnetic tape. In this manner, at least some of the monofilaments engage with the longitudinal edges of the magnetic tape, in contact engagement therewith, thus also acting as a guide element for the edges of magnetic tape.

From the foregoing description, it can be seen that the invention achieves the proposed aim and objects, and in particular the fact is stressed that the provision of a magnetic tape guide element constituted by a plurality of monofilaments which are fixed at their base, provides a magnetic tape guide system wherein contact occurs with combined bending and compressive stress on the various monofilaments. This has the consequent advantage of providing optimum pressure distribution, extremely low coefficients of friction, together with the possibility of having a very high dust confinement value.

The invention is susceptible to numerous modifications and variations, all within the scope of the inventive concept.

Moreover all the details may be constituted by other technically equivalent elements.

In practice, any materials, shapes and dimensions may be used providing that they are compatible with the specific use and contingent requirements.

I claim:

1. In combination, a magnetic tape and a magnetic tape guide element, comprising:
   a body positioned adjacent to said magnetic tape,
   at least one portion defined on said body, and
   a plurality of monofilaments each having an end and a free end, said monofilaments being located at least at said one portion of said body, said end of each of said monofilaments being fixed to said body, said free end of each of said monofilaments engaging said magnetic tape, in sliding contact engagement therewith.

2. Combination according to claim 1, wherein said monofilaments are arranged substantially orthogonally with respect to said body.

3. Combination according to claim 2, further comprising a support layer, said monofilaments being fixed to said support layer, said support layer being rigidly connected to said guide body.

4. Combination according to claim 1, wherein said monofilaments are connected directly to said guide body.

5. Combination according to claim 1, wherein said monofilaments each define a diameter, a useful length and a monofilament density, said diameter being comprised between 15 microns and 32 microns, said useful length being comprised between 0.6 mm and 1.6 mm, said monofilament density being comprised between 400 and 100 monofilaments per $mm^2$.

6. Combination according to claim 1, wherein said monofilaments are made of electrically conductive material.

7. Combination according to claim 1, wherein said monofilaments are made of synthetic plastic material, said synthetic plastic material being treated with electrically conductive material.

8. Combination according to claim 1, wherein said at least one portion defines a width dimension, and wherein said magnetic tape defines a tape width, said width dimension of said portion being at least equal to said tape width.

9. Combination according to claim 1, wherein said at least one portion defines a width dimension, wherein said magnetic tape has longitudinal edges, and wherein said magnetic tape defines a tape width, said width dimension of said portion being greater than said tape width, at least some of said monofilaments engaging said longitudinal edges of said magnetic tape.

10. Combination according to claim 1, wherein said body is constituted by a tube-like element.

11. Combination according to claim 1, wherein said body is constituted by a folded element, said folded element being folded to define a rounded configuration, said rounded configuration being directed towards said magnetic tape.

12. Combination according to claim 1, wherein said body is shaped to define a portion of a cylindrical surface.

13. Combination according to claim 1, wherein said body is constituted by a pin.

* * * * *